United States Patent

[11] 3,599,781

[72] Inventor Claud R. Hoadley
 Detroit, Mich.
[21] Appl. No. 838,436
[22] Filed July 2, 1969
[45] Patented Aug. 17, 1971
[73] Assignee Feedmatic-Detroit, Inc.
 Southfield, Mich.

[54] FEED WHEEL FOR FEEDING INTERMITTENTLY MOVABLE PARTS
 10 Claims, 3 Drawing Figs.
[52] U.S. Cl. ........................................................ 198/212, 64/29
[51] Int. Cl. ...................................................... B65g 29/00
[50] Field of Search ........................................... 198/22, 203, 212, 211; 64/29; 74/111, 125

[56] References Cited
 UNITED STATES PATENTS
 2,991,871 7/1961 Lupo .......................... 198/212

Primary Examiner—Evon C. Blunk
Assistant Examiner—Alfred N. Goodman
Attorney—Whittemore, Hulbert and Belknap ABSTRACT: The disclosure is of a feed wheel assembly for applying a continuous motive force to a train of intermittently movable parts. The feed wheel assembly has a feed ring mounted on a continuously driven clutch ratchet wheel, the latter having alternate crests and recesses along its periphery. Spring-pressed followers on the ring engage the crests and recesses of the clutch ratchet wheel to provide a yieldable drive to the feed ring. The followers are spaced apart different distances than the crests so that when the drive slips, the followers pass over the crests successively rather than simultaneously.

PATENTED AUG 17 1971

3,599,781

INVENTOR
CLAUDE R. HOADLEY
BY
Whittemore, Hulbert & Belknap
ATTORNEYS

FEED WHEEL FOR FEEDING INTERMITTENTLY MOVABLE PARTS

BACKGROUND OF THE INVENTION

One application of the present invention is in feeding a train of parts such as nuts through a track extending from a supply hopper to a machine which assembles the nuts with other parts in the manufacture of various products. The nuts are advanced through the track to the assembling machine which receives the nuts one at a time. The whole train of nuts upstream from the assembling machine moves intermittently as the leading nut is fed into the machine. The track is frequently several feet long and may follow an upward path to the assembling machine so that considerable motive force must be applied to the train. It is desirable to apply continuous force to the train so that the nuts will feed at any time into the assembling machine regardless of its time cycle of operation.

An example of a prior art feed wheel construction may be found in U.S. Pat. No. 2,991,871. In the patented construction, the feed wheel has a continuously driven disc provided with a circumferential cam surface surrounded by a ring with spring-pressed cam followers urged radially inwardly against the cam surface. The cam surface has alternate crests and inclined portions and engagement of the followers therewith provides a yieldable driving connection between the disc and the ring. The ring has studs which engage the nuts to be moved through the track. The ring is restrained against movement by the nuts when they are stationary, and the followers ride over the cam surface as the disc continues to turn. In the patented construction half the followers engage the crests of the cam surface of the disc at the same time while the other half of the followers engage the recesses.

SUMMARY OF THE INVENTION

One object of this invention is to provide a feed wheel assembly which will maintain a steadier and more uniform pressure on the parts during intervals when the drive slips than has heretofore been possible.

Another object is to provide a feed wheel assembly in which the distance between crests along the periphery of the disc is different than the distance between followers on the feed ring such that the followers ride over the crests in sequence rather than at the same time.

Another object is to provide a feed wheel assembly in which the followers are spaced apart whole number multiples of a distance which is slightly different than the distance between crests.

Another object is to provide a feed wheel assembly in which the number of followers is different than the number of crests.

Another object is to provide a feed wheel assembly in which the recesses are concave and relatively more abrupt at the trailing sides of the crests than at the leading sides thereof to reduce the periods of time during which the followers push in the reverse direction when the drive slips.

Another object is to provide a feed wheel assembly which is constructed so as to reduce the wear and tear on the drive pins and on the parts advanced by the assembly.

Another object is to provide a feed wheel assembly in which the followers are in the form of rollers.

Other objects and features of the invention will become apparent as the description proceeds, especially when taken in conjunction with the accompanying drawing, wherein.

Figure 1:
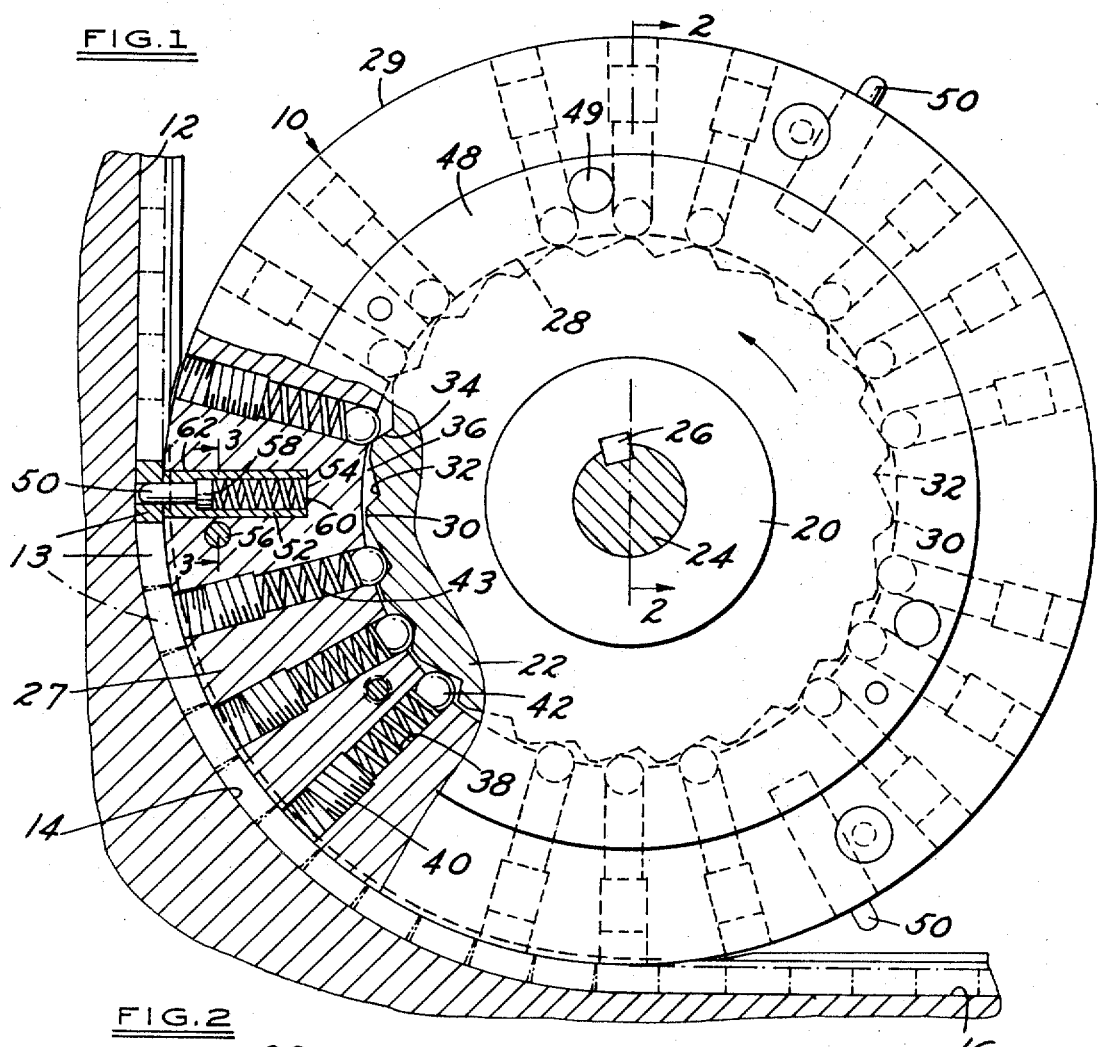
FIG. 1 is a side elevational view with parts in section showing a feed wheel assembly advancing a train of parts in an associated track, constructed in accordance with my invention.

Referring now more particularly to the drawing, the feed wheel assembly is generally designated 10 and is shown in association with an elongated track 12 for guiding a line of parts, in this instance nuts 13. As noted above, the track 12 may guide the nuts from a hopper to a machine which assembles them with other parts in the manufacture of various products. The track 12 extends downwardly then through a curved section 14 around the periphery of the feed wheel assembly 10 and continues in a horizontal section 16 to the assembling machine, not shown.

The feed wheel 10 comprises a clutch ratchet wheel 18 which has a hub 20 and an integral substantially circular disc 22 extending radially outwardly from the hub. The hub is nonrotatably mounted on a shaft 24 by a key 26 held by setscrew 23. The shaft 24 is power driven. The feed wheel assembly also includes a feed ring 27 which has circular radially inner and radially outer surfaces 28 and 29 and which surrounds the disc 22. The radially inner surface of the feed ring is only slightly larger than the maximum diameter of the disc 22 at the crests 30 along its periphery to provide a slight clearance.

The radially outer periphery of the disc 22 has a plurality of recesses or depressions 32 spaced apart equally around the full circumference thereof and defining the crests 30 between the recesses. The crests or high points 30 around the periphery of the disc 22 lie on a circle concentric with the hub 20 and are spaced equal distances from one another. The recesses are generally concave and are relatively more abrupt on the trailing sides of the crests than on the leading sides thereof (the arrow in FIG. 1 indicates the direction of rotation of the shaft and clutch ratchet wheel). More specifically, these recesses are V-shaped having the surfaces 34 at the trailing sides of the crests 30 extending at a steeper angle radially inwardly than the surfaces 36 at the leading sides of the crests.

Figure 2:
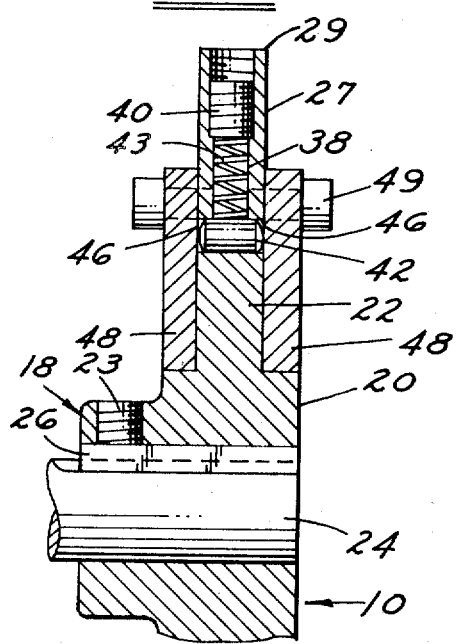
FIG. 2 is a fragmentary sectional view taken on the line 2—2 of FIG. 1.
Figure 3:
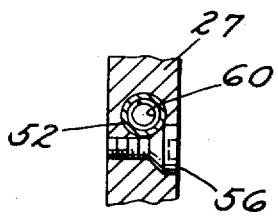
FIG. 3 is a fragmentary sectional view taken on the line 3—3 of FIG. 1.

The feed ring 27 is formed with a plurality of radially extending bores 38. The outer ends of these bores are enlarged slightly and threaded and closed by removable plugs 40. Followers in the form of rollers 42 are disposed in the bores and spring pressed radially inwardly against the periphery of the disc 22 by coil springs 43 compressed within the bores between plugs 40 and the rollers. It will be noted in FIG. 2, that the sides of the feed ring at the inner ends of the bores are open or cut away as indicated at 46 to accommodate the ends of the rollers 42 the longitudinal axes of which extend parallel to the shaft 24.

Annular side plates 48 secured to the opposite sides of feed ring 27 by fasteners 49 project radially inwardly along opposite sides of the disc 22 and their radially inner edges bear upon the hub 20 to take radial thrust. Side plates 48 do not interfere with the relative rotation between the disc 22 and the feed ring 27 when the drive slips.

The bore 38, and hence the rollers 42 are arranged in groups of three and the distance between the rollers of each group is equal and is slightly less than the distance between the crests 30 on disc 22. It will also be noted that the distance between the rollers 42 of adjacent groups is twice the distance between rollers in the individual groups so that obviously there would be room for additional rollers to be mounted in bores between the groups of rollers shown. The feed ring 27 may be constructed by mathematically dividing it into a given number of radial parts or segments which are of equal angular extent, in this instance 24 such segments, and then forming the bores 38 along the radial lines where segments meet, but omitting certain bores at the six equally spaced points so as to separate the bores and associated rollers into six groups of three.

In three of these six spaces, drive pins 50 are provided for advancing the nuts 13 in the track. Tubular members 52 are secured in radial bores 54 in the feed ring 27 by screws 56. These bores open through the radially outer surface 29 of the feed ring 27 and the radially outer ends of the sleeves are flush with the surface 29. The pins 50 have heads 58 within the tubular members 52, and coil springs 60 within the tubular members compressed between the bottoms of bores 54 and the heads 58 of pins 50 resiliently urge the pins radially outwardly to the extended positions shown, which positions are determined by shoulders 62 within the tubular members 52 engaging the heads 58 of the pins. In the extended positions of the pins 50 shown FIG. 1, the outer ends of the pins project beyond the peripheral surface 29 of the feed ring and are adapted to enter the holes in the nuts 13 to advance the line of nuts through the track. The pins may, of course, retract within the feed ring under radial pressure but will snap out to their extended positions when free to do so to project into the hole in a nut.

As noted, the feed ring 27 may be constructed by mathematically dividing it into 24 equal segments so that the rollers 42 in each group are spaced apart a distance equal to one twenty-fourth the inner circumference of the feed ring. In the present instance, the disc 22 is formed with 23 equally circumferentially spaced crests 30 so that the crests are spaced apart one twenty-third the circumference of the disc 22 at the crests. The fact that the spacing between the rollers 42 is slightly less than the spacing between crests 30 results in the rollers passing over the crests in sequence or one after another rather than all at the same time. Thus considering FIG. 1, the topmost roller 42 is shown as substantially at the peak of a crest 30. However, proceeding clockwise, the succeeding rollers are progressively farther and farther removed from an adjacent crest. Therefore, when the drive slips, the rollers 42 will pass over the crests 30 one after another.

It will be understood that some or all of the spaces in the ring 27 between groups of rollers 42 could if desired be filled with additional rollers. If each of the spaces between the groups of rollers held an additional roller, then there would be 24 equally spaced rollers and 23 equally spaced crests spaced slightly farther apart than the rollers. However, in the present instance some of these spaces are used to accommodate drive pins 50 for the nuts. It will be appreciated that the number of crests and rollers employed in the feed wheel is not critical. There might, for example, be fewer crests and rollers. However, there should not be an equal number of uniformly spaced crests and uniformly spaced rollers, or stated in another way, the roller spacing should not be the same as the crest spacing because then all of the rollers would pass over the crests at the same time, resulting in pulsations of large magnitude and resultant wear and tear on the nuts and on the parts of the feed wheel assembly 10.

In use, the feed wheel assembly is disposed adjacent to the track 12 so that the outer periphery of feed ring 27 enters the tract at its curved region 14. The feed ring 27 thereby contains the nuts within the curved region 14 of the track. A motor drive (not shown) is then set in continuous motion to continuously turn shaft 24 and hence clutch ratchet wheel 18. The rollers 42 bearing upon the periphery of the disc 22 cause the feed ring 27 to turn with the disc. Since the surfaces 36 at the leading sides of the crests 30 are formed at a shallower angle than the surfaces 34 at the trailing sides thereof, more of the rollers will be acting on the shallow surfaces 36 than on the steeper surfaces 34 and hence most of the spring pressure of the rollers will be effective to turn the feed ring 27 without slipping. Ring 27 will turn until one of its outwardly projecting pins 50 snaps into the hole in a nut 13 under the action of its spring 60.

Thereafter until the pin 50 is withdrawn from the nut, the feed ring 27 will exert a continuous motive force on the train of nuts tending to feed the train toward the downstream end 16 of the track. If the train of nuts is free to move, feed ring 27 moves it. When, however, the train of nuts is restrained during movement such as during the periods when no nuts are feeding out of the end of the track, feed ring 27 is held stationary. Clutch ratchet wheel 18 continues to turn with shaft 24. The inclined portions 36 of the recesses in the periphery of disc 22 force the rollers 42 radially outwardly against the action of springs 43. Thus, the drive connection between disc 22 and feed ring 27 will slip.

Since the spacing between the rollers 42 in each group of rollers is slightly less than the spacing between crests 30 on the periphery of disc 22, the rollers will pass over the crests 30 in a steady sequence, one after the other, rather than all at one time. Thus referring to FIG. 1, let it be assumed that the clutch disc 22 is turning and the feed ring 27 is restrained and held stationary. If the roller seen at the top of the figure may be considered as just passing over a crest 30, then moving clockwise from the topmost roller each of the succeeding rollers are spaced increasing distances from adjacent crests and will pass over the crests one after another. This sequential movement of the rollers over the crests of the disc 22 will continue as long as the feed wheel 27 is restrained. Since the trailing surfaces 34 of the recesses are steep, the rollers engage such trailing surfaces only during a small portion of their movement so as to reduce the periods of time during which the followers are pushing in a reverse direction.

This construction accordingly in which the rollers pass over the crest in a rapid sequence and one after another, rather than all at the same time, minimizes the pulsing transmission of motive force to the feed ring 27 and sharply reduces the hammering and wear and tear of the feed pins 50 and nuts 13. A steadier, more constant pressure on the nuts also results. Thus, the parts of the feed ring will have a longer life and the nuts will be less likely to be damaged. Also, the use of rollers instead of balls as followers results in less wear on the periphery of disc 22.

As soon as the restraint on the train of nuts is removed, the feed ring 27 will stop slipping and will be driven continuously with the clutch rachet wheel 18 to advance the train of nuts.

I claim:

1. Apparatus for moving parts along a predetermined path comprising a first member having along an annular peripheral portion thereof a series of equally spaced crests and intervening depressions, a ring member mounted on and movable relatively to said first member and having a plurality of followers yieldably spring-urged into engagement with said peripheral portion to form a yieldable driving connection between said members, said followers being movable to follow said crests and depressions to facilitate movement of said first member when movement of said ring member is restrained, means operative to drive said first member, said followers being spaced apart so that whenever one of said followers engages a crest some of the remaining followers respectively engage said peripheral portion at points successively spaced increasing distances in one direction from adjacent crests so as to ride over said crests in sequence when movement of said ring member is restrained to reduce pulsations in the driving force of said first member transmitted to said ring member, and means operatively connected to said ring member and adapted to engage a part and move it along said path.

2. The apparatus defined in claim 1, wherein the number of said followers is different than the number of said crests.

3. The apparatus defined in claim 1, wherein said followers are spaced apart whole numbers multiples of a distance which is slightly different than the distance between crests.

4. The apparatus defined in claim 3, wherein said recesses are concave and relatively more abrupt at the trailing sides of said crests than at the leading sides thereof.

5. The apparatus defined in claim 3, wherein said recesses are generally V-shaped having the surfaces thereof at the trailing sides of said crests extending radially inwardly at a steeper angle than the surfaces at the leading sides thereof.

6. Apparatus for applying a continuous motive force to intermittently movable objects comprising a first member having along a peripheral portion thereof a series of equally spaced crests and intervening depressions, a second member movable relatively to said first member and having a plurality of followers yieldably spring-urged into engagement with said peripheral portion to form a yieldable driving connection between said members, said followers being movable to follow said crests and depressions to facilitate movement of one of said members when movement of the other of said members is restrained, means operative to drive said one member, said followers being spaced apart so that whenever one of said followers engages a crest others respectively engage said peripheral portions at points successively spaced increasing distances in one direction from adjacent crests so as to ride over said crests in sequence when movement of said other member is restrained to reduce pulsations in the driving force of said one member transmitted to said other member, and means operatively connected to said other member and adapted to apply a continuous motive force to said objects.

7. The apparatus defined in claim 6, wherein said followers are spaced apart whole number multiples of a distance which is different that the distance between crests.

8. The apparatus defined in claim 6, wherein said recesses are concave and relatively more abrupt at the trailing sides of said crests than at the leading sides thereof.

9. The apparatus defined in claim 1, wherein said followers are so spaced apart that each passes over a crest at a different time and all in sequence.

10. The apparatus defined in claim 1, wherein said followers are cylindrical rollers.